US012670676B2

(12) United States Patent
Vandikas et al.

(10) Patent No.: US 12,670,676 B2
(45) Date of Patent: Jun. 30, 2026

(54) METHOD AND DEVICE FOR FACILITATING A PRIVACY-AWARE REPRESENTATION IN A SYSTEM

(71) Applicant: Telefonaktiebolaget LM Ericsson (publ), Stockholm (SE)

(72) Inventors: Konstantinos Vandikas, Solna (SE); Daniel Lindström, Luleå (SE); Lackis Eleftheriadis, Valbo (SE); Athanasios Karapantelakis, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 106 days.

(21) Appl. No.: 18/692,158

(22) PCT Filed: Sep. 15, 2021

(86) PCT No.: PCT/EP2021/075313
§ 371 (c)(1),
(2) Date: Mar. 14, 2024

(87) PCT Pub. No.: WO2023/041150
PCT Pub. Date: Mar. 23, 2023

(65) Prior Publication Data
US 2024/0428528 A1     Dec. 26, 2024

(51) Int. Cl.
*G06T 19/00*      (2011.01)
*G06F 21/62*      (2013.01)

(52) U.S. Cl.
CPC ........ *G06T 19/006* (2013.01); *G06F 21/6245* (2013.01)

(58) Field of Classification Search
None
See application file for complete search history.

(56) References Cited

U.S. PATENT DOCUMENTS

| 11,138,807 B1 * | 10/2021 | Inha ...................... G06T 15/506 |
| 2018/0189552 A1 | 7/2018 | Barnett et al. |
| 2021/0035313 A1 | 2/2021 | Ghadyali et al. |

FOREIGN PATENT DOCUMENTS

WO      2015/192117 A1   12/2015

OTHER PUBLICATIONS

International Search Report and Written Opinion issued in International Application No. PCT/EP2021/075313 dated May 13, 2022 (10 pages).

(Continued)

*Primary Examiner* — Robert J Craddock
(74) *Attorney, Agent, or Firm* — Rothwell, Figg, Ernst & Manbeck, P.C.

(57)          ABSTRACT

Embodiments herein disclose a method for facilitating a privacy-aware representation in a system. The method comprises determining using a content analyzer a layout of a scene. Thereafter, one or more objects in the scene is identified using the content analyzer to define a relationship between the objects. A privacy status to be tagged to the one or more identified objects is inferred by using a machine learning model. At least one object is processed based on the privacy status inferred. A privacy-aware representation of the scene is rendered, wherein the privacy-aware representation displays the scene with at least one processed object.

15 Claims, 7 Drawing Sheets

(56) References Cited

OTHER PUBLICATIONS

Xu, D et al., "Scene Graph Generation by Iterative Message Passing", Apr. 12, 2017 (10 pages).
Zarepour, E et al., "A Context-based Privacy Preserving Framework for Wearable Visual Lifeloggers", IEEE, 2016 (4 pages).
De Guzman, J. A. et al., "Security and Privacy Approaches in Mixed Reality: A Literature Survey", Jun. 10, 2020 (41 pages).
Jana, S. et al., "A Scanner Darkly: Protecting User Privacy From Perceptual Applications", IEEE, 2013 (15 pages).

\* cited by examiner

Start

401. Determine a layout of a scene

402. Identify one or more objects in the scene

403. Infer a privacy status to be tagged to one or more identified objects

404. Processing at least one object based on the privacy status inferred

405. Rendering a privacy aware representation of the scene on mixed reality system

METHOD AND DEVICE FOR FACILITATING A PRIVACY-AWARE REPRESENTATION IN A SYSTEM

CROSS REFERENCE TO RELATED APPLICATIONS

This application is a 35 U.S.C. § 371 National Stage of International Patent Application No. PCT/EP2021/075313, filed 2021 Sep. 15.

The present application relates to a field of mixed reality, and more specifically to method and system for protecting privacy in one of mixed reality environments, virtual environment, extended reality environment or augmented reality environments.

BACKGROUND

Augmented Reality (AR) is a computer graphics technique that synthesizes virtual objects or information and displays them like objects present in an original/real environment. Recent advances in depth mapping and object recognition have paved the way for immersive in-room augmented reality experiences. These are experiences that periodically or continuously monitor the state of a room, then displays virtual objects in a user's field of vision. For example, existing hardware and applications enable scanning of an entire room to obtain a 3D model of the room geometry and 3D model of objects or people within the room. AR glasses can then display a virtual content on various surfaces in the room. Further, voice commands, gestures, persons, faces, animals, furniture, and other objects can be recognized in real-time, enabling AR applications to sense and respond to real-world events and objects.

Another widely used technology, Virtual Reality (VR) is fully immersive, which tricks a user's senses into thinking they are in a different environment or world apart from the real world. VR is typically produced by a head-mounted display (HMD) or a headset that provides a computer-generated world of imagery and sounds in which you can manipulate objects and move around using haptic controllers while being tethered to a console or PC.

Mixed reality produced by various devices or displays can bring together real world and digital elements. In mixed reality, users can interact with and manipulate both physical and virtual items and environments, using next-generation sensing and imaging technologies. Presently, mixed reality has a hybrid definition that combines aspects of AR and VR to deliver rich services and immersive experiences and allows interaction of real objects with synthetic virtual objects and vice versa. As these and related technologies become widespread, untrusted applications or users may have increased access to various forms of private data about the user and his/her surroundings. Examples of such data include content displayed on a computer, room size and layout, number, size, personal objects such as furniture, books, pictures and visible text in the room, etc. A typical Mixed Reality Environment, as the one in FIG. 1, illustrates a scene, where there exists a combination of devices plus additional data services typically stored in cloud infrastructures which record user data but also provide additional information from other sources such as third-party applications or social networks. The same scene recognizes (at least) 5 points where sensitive information might occur—1) in the contents of the display monitor, 2) in the data stored in the cloud infrastructure, 3) in a virtual display that is providing additional information, 4) when collaborating with users and 5) information captured from the mixed reality eyewear/headset. Existing approaches to addressing privacy concerns related to exposure of such data typically take one of the below approaches.

One typical approach generally ignores privacy concerns and allows applications to obtain unrestricted access to raw sensor data for use in rendering content relative to the room based on that sensor data. This type of rendered content can be used in various gaming technologies, academic projects, vertically integrated augmented reality experiences, etc. Clearly, one disadvantage of such applications is that users are expected to trust these applications with access to potentially sensitive data gathered by various sensors.

Another typical approach to addressing privacy concerns with respect to sensor data provides one or more application programming interfaces (API's) that gives developers and applications sharply restricted access to a subset of sensor information needed for a specific application. Such API typically tightly controls how applications render content using camera, sensors and the like. Each narrow API supports only a limited class of applications, and is custom-tailored for each application. As a result, these types of API's tend to have limited usefulness.

In another approach, there exists a control rights technique with privacy nutrition labels which describes what information may be collected which could be further linked to a user's identity. Even though this approach provides some privacy, it does not allow the user to fine-tune the usage based on user preferences. The approach offers an opt-in or opt-out scenario where in the latter case the user is no longer allowed to use the application.

A direct application of the aforementioned access control rights techniques would require an exhaustive list that contains all possible sources of data along with all possible applications. Further, the user would be required to iterate through that exhaustive list and modify it accordingly to their needs.

Accordingly, there is a need to overcome the above-mentioned problems and to protect privacy in any of mixed reality environment, augmented reality, or augmented reality environments. Further, there exists a need to obtain preferences of the user (herein user is sender of content) regarding privacy of one or more objects and use said information for processing and rendering images.

SUMMARY

The aforementioned needs are met by the features of the independent claims. Further aspects are described in the dependent claims. It is an object of embodiments herein to protect privacy in one of a mixed reality environment, virtual reality, augmented reality and extended reality environment. Particularly, it is an object of embodiments herein to facilitate privacy to a sender (herein sender is a producer of a content) by rendering a privacy-aware representation of a scene. This object is achieved by identifying privacy status associated with one or more objects in the scene and processing the scene to render the privacy-aware representation. It is also an object of embodiments herein to provide a method to obtain preferences of the sender regarding privacy of one or more object and further use said information for processing and rendering images. It is another object of embodiments herein to obtain a point of interest of a receiver viewing the mixed reality content and use the point of interest for processing the privacy-aware representation.

According to a first aspect of the present disclosure there is provided a computer-implemented method for facilitating a privacy-aware representation in a system. The method comprises determining, using a content analyzer, a layout of a scene. The scene is received through a user input device and the scene comprises a set of objects with varying privacy requirements. The method comprises identifying, using the content analyzer one or more objects in the scene to define a relationship between the objects. The method comprises inferring a privacy status to be tagged to the one or more identified objects by using a machine learning model. The machine learning model uses the relationship between the objects as an input. The method comprises processing at least one object based on the privacy status inferred. The method comprises rendering a privacy-aware representation of the scene, wherein the privacy-aware representation displays the scene with at least one processed object. The step of processing at least one object comprises one of: partially concealing the object, completely concealing the object, transforming the object, or transforming an area around the object.

In some embodiments, the method may further comprise obtaining a receiver's preferences about at least one processed object from the privacy-aware representation through a point of interest module. The method further comprises providing the receiver's preferences to the sender and receiving an input from the sender in response to the receiver's preferences. Further, defining a user action (a) based on the input from the sender, by the machine learning model to process at least one object.

In some embodiments, the method may further comprise configuring the machine learning model in a training phase with the one or more identified objects as input to define a state of the one or more identified objects. The state indicates an existing privacy status associated with the one or more identified objects. The method further comprising configuring the machine learning model in the training phase to predict an action $(a'_i)$ to process the one or more identified objects. The method further comprises configuring the machine learning to iteratively update the state and action associated with the one or more identified objects based on the user action. In some embodiments, the method may further comprise configuring the machine learning model to calculate a reward (r) which enables the agent to predict the action similar to the user action by minimizing or maximizing the difference between the predicted action and the user action using a weight factor per object.

According to a second aspect of the present disclosure, there is provided a system for facilitating a privacy-aware representation. The system includes a content analyzer configured to determine a layout of a scene through a content analyzer, wherein the scene is received through a user input device and the scene comprises a set of objects with varying privacy requirements. The content analyzer is also configured to identify one or more objects in the scene to define a relationship between the objects. The system includes a polarizer configured to infer a privacy status to be tagged to the one or more identified objects using a machine learning model with the relationship between the objects as an input. The system includes a renderer configured to: process at least one object based on the privacy status inferred. The renderer is also configured to render a privacy-aware representation of the scene, wherein the privacy-aware representation displays the scene with at least one processed object.

Certain embodiments may provide an advantage of customizing privacy for each user in the mixed reality environment. Another advantage is that embodiments herein overcome the need for a labelled dataset with entire list of objects and their privacy status. This is achieved by a machine learning model that learns the choices made by the sender over time to define the privacy status of each object and/or categories of objects. This enhances prediction of privacy for each object with time. Yet another advantage is that the learnings and privacy status could be stored on sender's side equipment such as tablet, headset, smartphone, thereby improving privacy. Yet another advantage is that embodiments herein could be implemented on any hardware device with computing capabilities, and data (state-action data from machine learning model) could be implemented in a coarse-grained API, where data is typically housed in a few large components, or as a fine-grained API, where the data is spread across a large number of smaller components.

BRIEF DESCRIPTION OF THE DRAWINGS

The accompanying drawings, which are included to provide a further understanding of the disclosure and are incorporated in a constitute a part of this application, in which.

DETAILED DESCRIPTION

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

Further, the scope of the invention is not intended to be limited to mixed reality, but also can be extended to augmented reality, extended reality and virtual reality devices/ platforms.

Deep Q Network

Deep Q network also known as Deep Neural Network (DNN) uses agents by employing experience replay to learn about their environment and update main and target networks. For example, Deep Q network receives a state as an input and outputs Q-values of all possible actions for that state.

Q-Learning

Some embodiments herein use Q-learning which uses Q-values (also called action values) to iteratively improve the behavior of a learning agent. Q-values are defined for states and actions, for example, Q (S, A) is an estimation of how good it is to take an action A at a current state S of an agent. At every step of transition, the agent from a state takes an action, observes a reward from the environment, and then transits to another state. Thereafter, for a next state S', the agent can determine the next best action A' by selecting an action that can have maximum Q-value.

Scene Graph

Scene graph is a platform used to explicitly model objects and their relationships. In short, the scene graph is a visually-grounded graph over the object instances in an image produced by one or more bounding boxes.

Figure 1A:
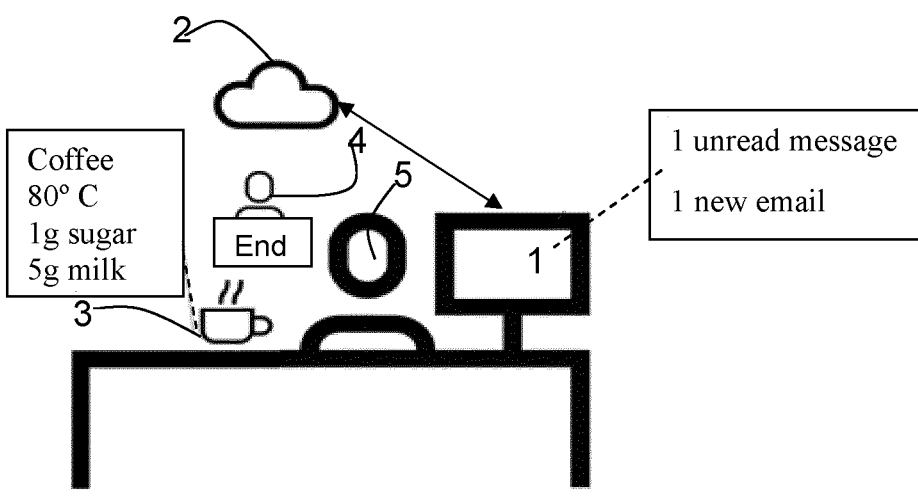
FIG. 1*a* is a schematic diagram illustrating an exemplary mixed reality environment, according to existing methods.
Figure 1B:
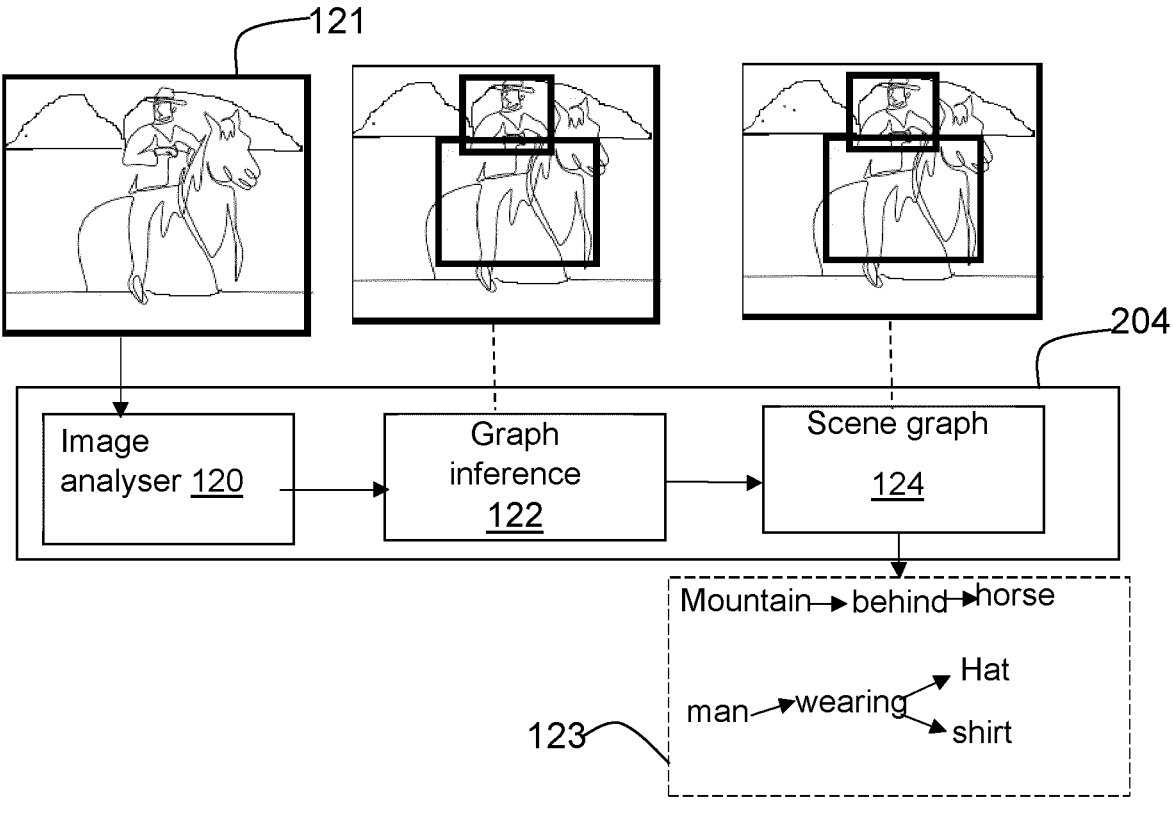
FIG. 1*b* is a schematic block diagram illustrating a content analyzer, according to existing methods.

The scene graph may be generated by a content analyzer 204, which is illustrated in FIG. 1b. The content analyzer 204 comprises an image analyzer 120 that receives an image 121 as input and outputs a scene graph 124 that consists of object categories, their bounding boxes, and semantic relationships between pairs of objects (as shown in box 123). The image analyzer 120 could be a combination of a convolutional neural network and a regional proposal network (RPN). RPN is a fully convolutional network that simultaneously predicts object bounds and object scores at each position. The image analyzer 120 further transmits object proposals to a graph inference 122. The graph inference 122 uses Recurrent Neural Networks (RNN) to obtain edge predictions while treating edges of the bounding box as pairwise constraints. The graph inference 122 also uses a dynamic RNN that can refine its predictions through message passing. Finally, the graph inference 122 generates the scene graph 124 which contains categories of each object, and relationship types between each pair of objects. For example, box 123 illustrates the scene graph of the image 121 with objects "mountains, man, horse, hat, shirt" with their relationship defined by words "behind, wearing" etc. A detailed approach to scene graph generation is explained in "Scene Graph Generation by Iterative Message Passing" by Danfei Xu et. El. 12 Apr. 2017 (https://arxiv.org/abs/1701.02426)

Figure 1C:
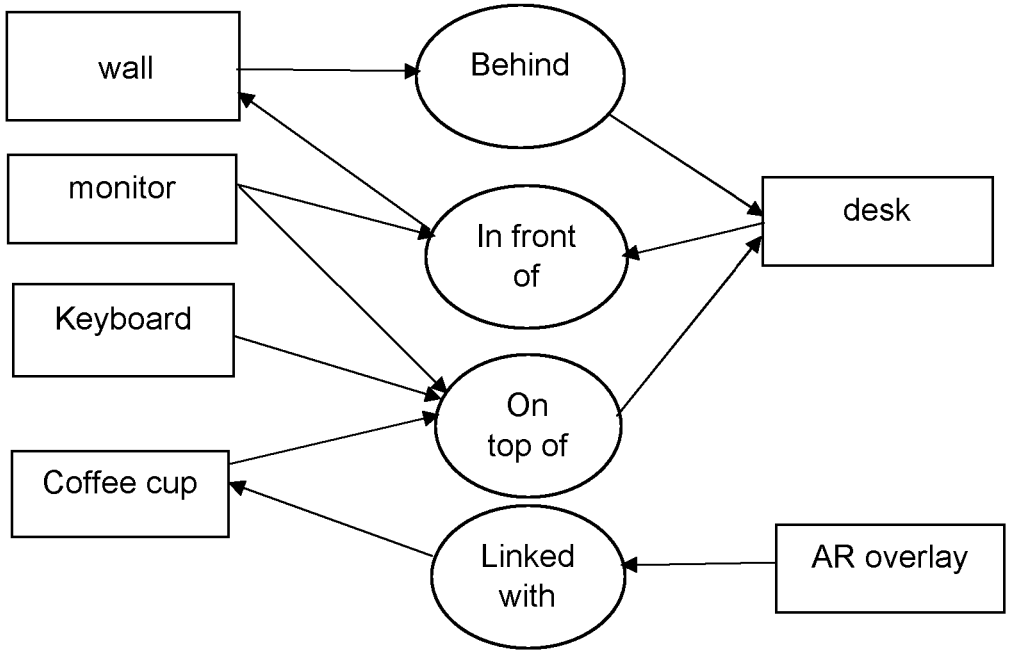
FIG. 1*c* illustrates an exemplary scene graph generated by the content analyser.

Another example scene graph generated for scene represented in FIG. 1a is illustrated in FIG. 1c with identified objects, for example, wall, monitor, keyboard, coffee cup, desk, AR overlay and the like and their relationship defined by words "behind, linked with, on top of, in front of".

Mixed Reality

The term mixed reality used with respect to the embodiments herein, could be a combination of virtual reality and augmented reality that enables interaction with and among real-world and virtual objects. In another embodiment, mixed reality could be any immersive experience that allows interaction of real objects with synthetic virtual objects.

Privacy-Aware Representation

The term privacy-aware representation refers to computer-processed three-dimensional images with a combination of real objects and virtual objects that masks or conceals objects compromising privacy or confidentiality. The privacy-aware representation could be rendered by a wearable device, such as a holographic device and an immersive device. The privacy-aware representation explained herein is executed by a machine learning model/algorithm that identifies privacy requirements of objects present in a scene and further processes the scene to mask or conceal objects with privacy requirements.

The embodiments described herein address the problem of facilitating privacy to a user (or a sender) in a system. The system is one of a mixed reality system, augmented reality system, virtual reality system or extended reality system. The embodiments disclosed herein provide a system and a method to render a privacy-aware representation of a scene by identifying a privacy status associated with one or more objects in the scene. The embodiments also provide a method to obtain the preferences of the sender regarding privacy of one or more object and further use said information for processing and rendering images. The embodiments disclosed herein also provide a method to obtain a point of interest of a receiver viewing the content and use the point of interest for processing the privacy-aware representation.

Figure 2A:
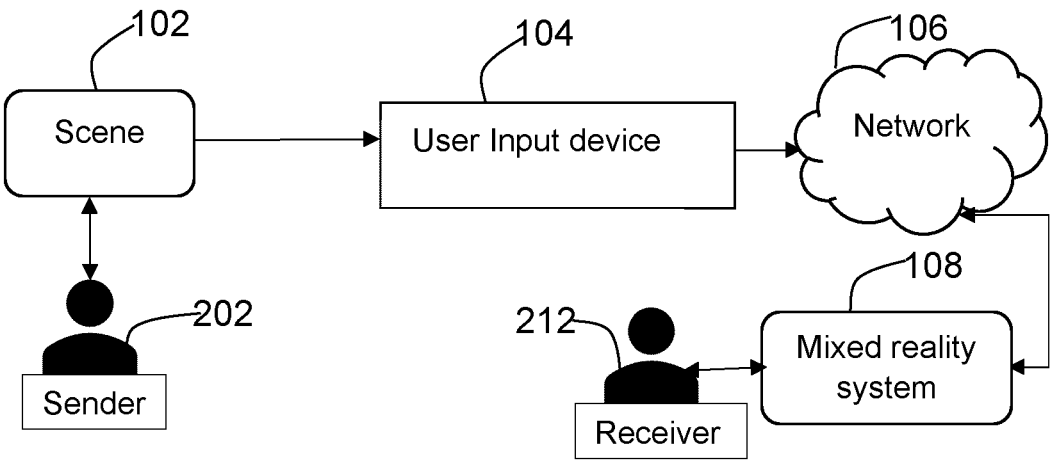
FIG. 2*a* is a schematic overview illustrating an architecture according to some embodiments herein.

FIG. 2a is a generalized block diagram, wherein embodiments herein may be implemented. As shown in FIG. 2a, a user input device 104 is in communication with a system 108 via a network 106. The system 108 is one of a mixed reality system, augmented reality system, virtual reality system or extended reality system. In some embodiments, the user input device 104 is in communication with the system 108 directly without the network 106. The user input device 104 may encompass, for example, a mobile device, computer, tablet, desktop, sensors or any other device used by an end-user or the sender 202 capable of capturing objects in the vicinity. The user input device 100 may also capture touch inputs, haptic feedbacks and the like from the sender 202. The system 108 may be a display device or a wearable device, a head mount device or other processing unit capable of producing augmented reality or mixed reality content to a receiver 212. In an example, the system 108 may include an application server, a network server or other device that is capable of receiving a scene and rendering privacy aware representations of the scene. In embodiments herein, the system 108 is capable of rendering privacy-aware representations of mixed reality content to the receiver 212. The network 106 may be a 3GPP-type cellular network, the Internet, a wireless communications network, for example, Long-Term Evolution (LTE) network, 5G network, NR-U or Next Gen System or network, Licensed-Assisted Access (LAA) and the like. In an embodiment, the network 106 could be also be a network of computers, e.g., servers, in the cloud capable of receiving and processing mixed reality content.

Figure 2B:
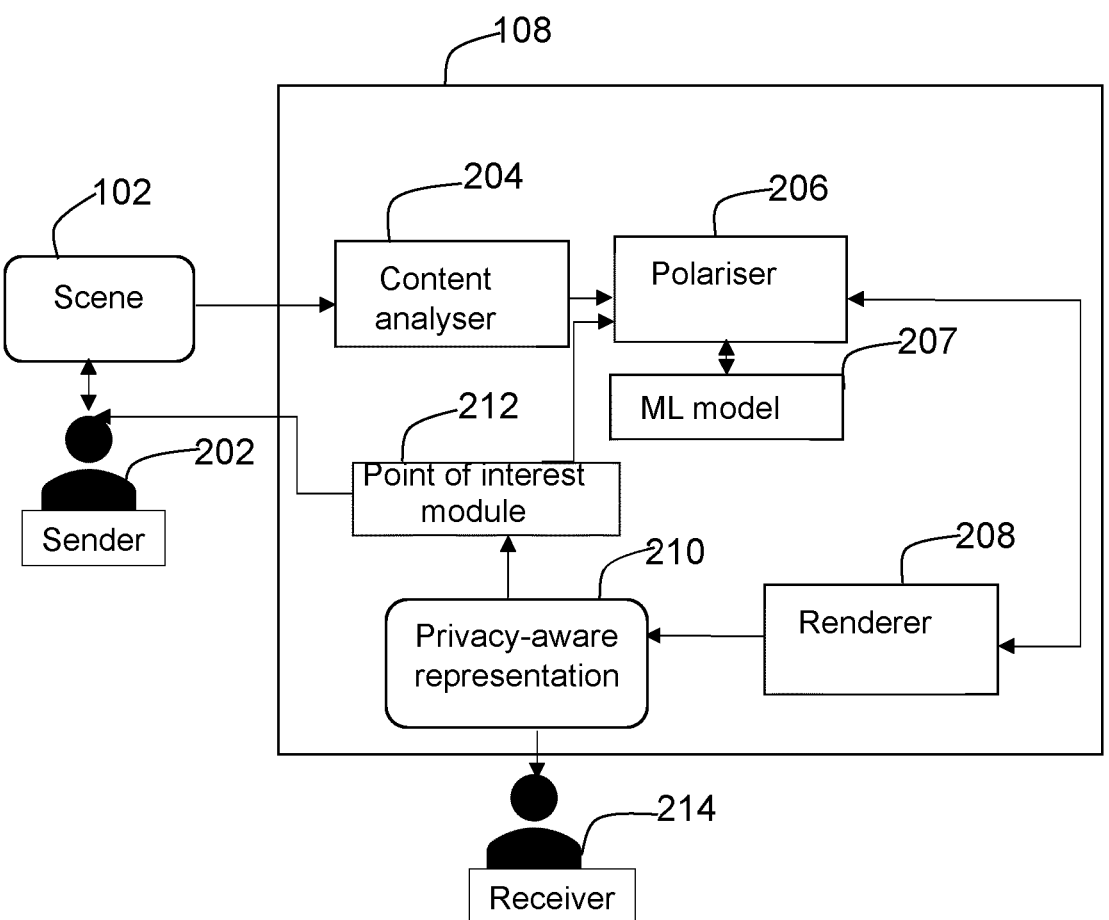
FIG. 2*b* is a schematic block diagram illustrating an non-limiting example arrangement of a system, according to some embodiments herein.

FIG. 2b is a block diagram of components of a system, according to some embodiments. The system 108 may comprise a content analyzer 204, a polarizer 206, a rendering module 208. A scene 102 may be obtained through one or more sensors, camera, video device and the like present at the sender's location. The scene comprises at least one of an image content, audio-visual content and an audio content. Thereafter, the content analyzer 204 may receive the scene 102 from the sender 202 through the user input device 104 (not shown in FIG. 2b). The content analyzer 204 is configured to determine a layout of the scene 102. The scene 102 may typically comprise a set of objects with varying privacy requirements. For example, some objects in the scene may be private to the sender, such as personal photographs, laptop screen content and the like. Meanwhile, the sender 202 may be willing to reveal some other objects in the scene 102, such as wall, senders face, or computer peripherals. The content analyzer 204 is further configured to identify one or more objects in the scene 102 to define a relationship between the objects. In an exemplary embodiment, the content analyzer 204 constructs a scene graph (as described in FIG. 1b) which describes the relationships between the one or more objects that are identified in the scene. In order to construct scene graph, the content analyzer 204 relies on a process of message passing that is exchanged between the representation of each salient object to identify objects and their relationships. Thereafter, the content analyzer 204 provides the identified objects with their relationships to the polarizer 206. The polarizer 206 is configured to infer a privacy status to be tagged to the one or more identified objects by using a machine learning model (or ML model) 207. The machine learning model 207 uses the relationship between the objects as an input for further processing.

Some examples of machine learning model 207 that may be used in the polarizer 206 is trained using one of supervised learning, unsupervised learning, reinforcement learning, deep learning, Q-learning and the like. According to some embodiments, the problem may be formulated as a reinforcement learning problem (i.e., as a Markov Decision Process—MDP with unknown transition probabilities). For reasons of simplicity, a finite MDP is used in the definition, where state space and action spaces are finite (as elaborated below), however continuous state and action spaces may also be used. A reinforcement learning agent (or polarizer agent) initiated by the polarizer 206 learns from the state space and action space, elaborated below:

State Space

The state space contains identified objects, represented by item_id i1, i2, . . . in with an existing state of each item across a list of timesteps, t0, t1, t2 . . . t–k. The existing state indicates whether the item is visible or blurry. In tabular form this can be represented as shown in Table 1:

TABLE 1

| Item_id | t0 | t1 | t2 |
|---|---|---|---|
| i1 (i.e. wall) | 0 | 1 | 0 |
| i2 (i.e. monitor) | 1 | 0 | 0 |
| . . . | 1 | 0 | 0 |
| . . . | 0 | 1 | 1 |
| in (i.e. coffee cup) | 1 | 0 | 0 |

In another example, the state space could comprise values of 0.1, 0.2, 0.3, 0.4 and so on to represent a level of blurriness. In another example, the state space could comprise values of –1, –0.5, –0.3 and the like. As such the state space per timestep can grow based on the number of items, so for n items and two actions, the state space is $2^n$ (for example, considering all permutations of the items). Therefore, it is important to limit the state space to only the most important items. Alternatively, instead of representing individual objects/items, categories of objects may be considered, such as "Computer peripherals", "Office Material" and group objects. Thus, a sparse state space created is represented in Table 2:

TABLE 2

| Item_id | t0 | t1 | t2 |
|---|---|---|---|
| i1 (i.e. wall) | 0 | 1 | 0 |
| i2 (i.e. peripherals) | 1 | 0 | — |
| . . . | 1 | 0 | — |

User Specific State Space

In an embodiment, the state space could be user specific (herein user is referred to the receiver that is requesting/observing each item on the scene) or it can be shared with multiple users at the same time (general case). The state space in Table 1 may be extended with user specific state space, thereby enabling the polarizer 206 to learn from user-specific privacy settings. For example, the user specific state space may indicate that the sender is willing to display the object/item, such as a cup with a user (U0), and not willing to share the object/item with another user (U1) as defined in Table 3 below:

TABLE 3

| Item_id | U0, t0 | U0, t1 | U1, t0 | U1, t0 |
|---|---|---|---|---|
| i1 (i.e. wall) | 0 | 1 | 1 | 0 |
| i2 (i.e. peripherals) | 1 | 1 | 0 | — |
| I3 (cup) | 1 | 1 | 0 | 0 |

In order to limit the size of the above-mentioned state space, the users (U0, U1, --Un) could be grouped into categories, such as friends, co-workers.

Task Specific State Space

Another additional that may be added to the state space is task p, which indicates the plan of each user regarding items/objects. In an example, the task p may be defined as "input to machine learning process", "storing for a period of x days", "sharing with others". The addition of task p further enhances the state space since the agent will also learn privacy concerns related to the purpose behind any usage of such information. Consequently, the state space augmented with the task p is shown in Table 4.

TABLE 4

| Item_id | U0, t0, p1 | U0, t1, p1 | U1, t0, p1 | U1, t0, p1 |
|---|---|---|---|---|
| i1 (i.e. wall) | 0 | | 1 | 0 |
| i2 (i.e. peripherals) | 1 | | 0 | — |

Similarly, to the previous enhancement we can bound the state space either by making purpose specific state spaces (per user, per time period) or be grouping purposes that may span more than one time periods instead recording that information in fine granularity.

Action Space

The action space defines the set of possible actions which can be taken on the identified objects/item (received from scene graph), where the action is defined based on a privacy status required for each object/item. In an exemplary embodiment, the action space could be one action where the item i2 is displayed completely (indicated by value 1), or another action where the item i1 is blurred (indicated by value 0). In an example, the action can be a normalized value between 0 and 1 to indicate the degree of concealing. For example, action value 0 would mean that there is no concealing or blurring applied to the object, whereas action value 1 means that the object is completely concealed or blurred. The action space can be continuous or discrete, meaning that values can be arbitrary within [0,1] or they can increase in a stepwise approach, e.g., 0, 0.1, 0.2, . . . (step of 0.1). The action space is then combined with the objects/items that are in the scene represented by their unique identifiers i1, i2, . . . in. At a particular timestep, the action space can be represented as shown in Table 5.

TABLE 5

| Item_id | Action per user/per task |
|---|---|
| i1 (i.e. wall) | 0 |
| i2 (i.e. monitor) | 1 |
| . . . | 0 |
| in (i.e. coffee cup) | 1 |

Based on the values of action defined above, the polarizer 206 is configured to process one or more objects with the respective action from action space. The processing comprises partially concealing the object, completely concealing (or blurring) the object, transforming the object, or transform an area around the object. In an example, to perform object transformation, the action space could consist of vertices and their position in space (using a 3D coordinate system and a fixed point of reference in the scene), as well as the texture of the object (in terms of e.g., solid color for all pixels in the simplest case, or complex bitmaps with different RGB values in the most complicated case). Both texture composition and/or number and location of vertices may be changed.

After processing one or more objects in the scene, the processed scene is transmitted to the renderer 208. The renderer 208 renders a privacy-aware representation 210 of the scene with at least one processed object.

Reward Function

While implementing reinforcement learning agents, the polarizer is configured to choose a reward function that directs the reinforcement learning agents towards preferred target states by rewarding those states more. According to embodiments herein, the main goal of the reward function for the system 108 is to predict accurately at a given timestep, if the sender wants to allow a certain object/item to be visible or if the object/item should be concealed. In order to improve accuracy of identifying objects as private over time, the delta between predicted action $a'_i$ generated by the reinforcement learning agent and a user action $a_i$ defined by the sender 202 should be as small as possible. Example of the predicted action $a'_i$ are shown in Table 5.

According to embodiments herein, the reward function is implemented by obtaining the receiver's 214 preferences about at least one object in the privacy-aware representation 210 and further training the machine learning model 207 to learn sender's input in response to the receiver's preferences. This is achieved by obtaining receiver's 214 preferences through a point of interest module 212. The point of interest module 212 is configured to capture receiver's 214 eye gaze, tactile movements or touch and thereby identify objects of interest for the receiver. Thereafter, the receiver's 214 preferences are obtained by the sender 202. The sender 202 understands the objects of interest for the receiver 214 and provides an input to the polarizer to either display or conceal the objects of interest. Based on the input from the sender 202, the polarizer defines a user action at.

Since certain objects/items (or categories of items) may carry different importance in terms of privacy, a weight factor per object (or item or category) is considered to allow the system to make trade-offs between showing items of lower privacy as opposed to other items that the user considers more private. The reward is calculated using the formula, $$\text{reward} = \sum_i^n w_i(a'_i - a_i)$$

wherein, $w_i$ is the weight factor per object, $a'_i$ is the predicted action, and $a_i$ is the user action. The weight factor per object may vary based on the privacy status of the objects or object categories. In an example, object such as picture of family (i1) would have comparatively higher weight factor as compared to another object such as coffee mug.

Based on the reward calculated and user action di, the state and action associated with the one or more identified objects (defined in state space and action space) are updated iteratively to improve accuracy of predicted actions. The rendered privacy-aware representation 210 improves with the accuracy of predicted actions. Thereby, the system 108 is configured to provide improved privacy-aware representations with time.

According to an embodiment herein, the system 108 could be implemented in a cloud environment, an application server or a cloud server. The components content analyser 204, the polariser 206, the renderer 208, and ML model 207 could be part of the cloud environment. Thus, the cloud server could be configured to identify one or more objects in the scene to define a relationship between the objects. Further, the cloud server could be configured to infer a privacy status to be tagged to the one or more identified objects by using a machine learning model 207 stored therein. Finally, the cloud server could be configured to process at least one object based on the privacy status inferred and transmit the processed scene to the renderer for displaying to the receiver.

Figure 3:
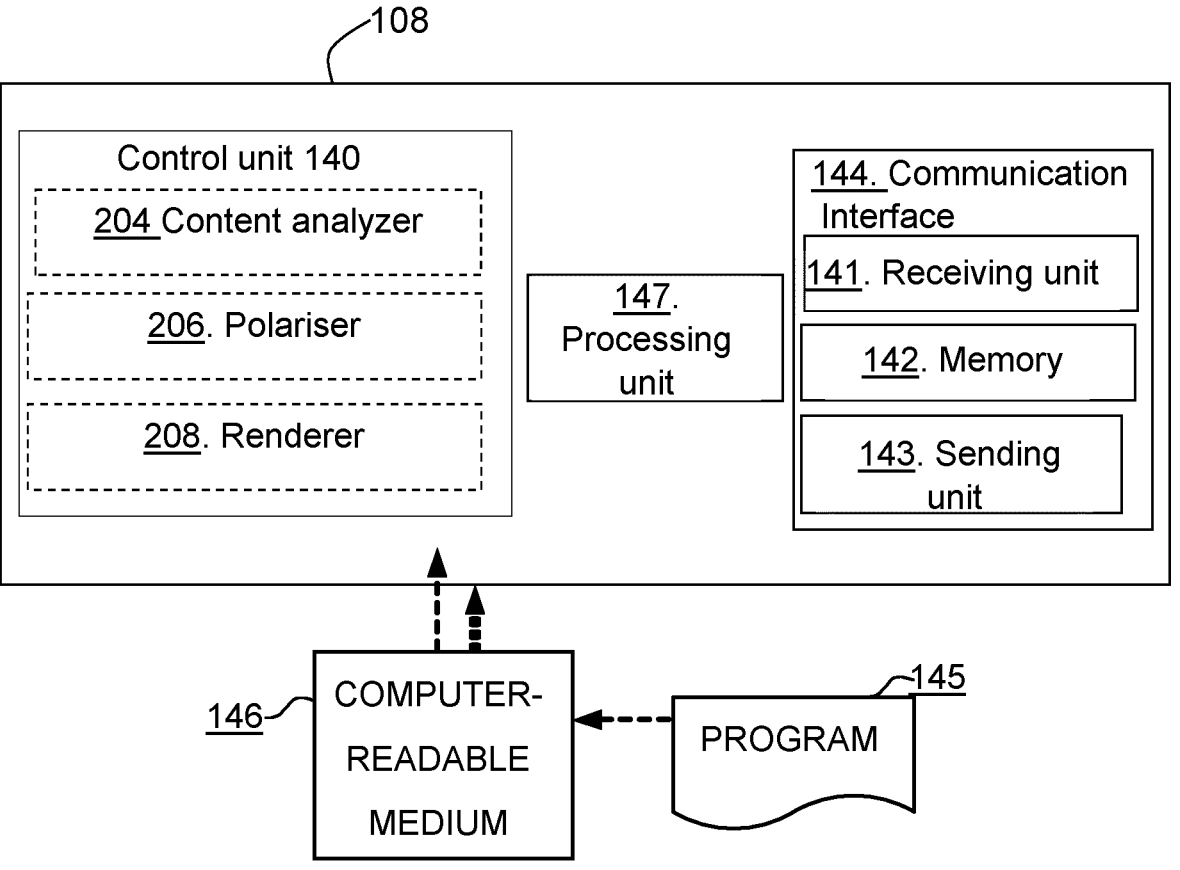
FIG. 3 is a schematic block diagram of the system according to some embodiments herein.

The system 108, may comprise an arrangement as depicted in FIG. 3 to facilitate a privacy-aware representation. FIG. 3 is a block diagram of the system 108 according to an embodiment.

The system 108 may comprise a communication interface 144 as depicted in FIG. 1*d*, configured to communicate e.g., with the control unit 140 and any user devices (not shown). The communication interface 144 may also be configured to communicate with other communication networks or IoT devices. The communication interface 144 may comprise a wireless receiver (not shown) and a wireless transmitter (not shown) and e.g. one or more antennas. The system 108 comprises a processing unit 147 with one or more processors. The system 108 may further comprise a memory 142 comprising one or more memory units to store data on. The memory 142 comprises instructions executable by the processor. The memory 412 is arranged to be used to store list of objects, state space, action space, ML models, metadata, instructions, configurations, and applications to perform the methods herein when being executed by the processing unit 147.

Thus, it is herein provided the system 108, comprising the processing unit 147 and a memory 142, said memory 142 comprising instructions executable by said processing unit 147, whereby said system 108 is operative to determine a layout of a scene through a content analyzer, wherein the scene is received through a user input device and the scene comprises a set of objects with varying privacy requirements. Further, the processing unit 147 and a memory 142 is configured to identify using the content analyzer, one or more objects in the scene to define a relationship between the objects. The processing unit 147 and a memory 142 is configured to infer a privacy status to be tagged to the one or more identified objects by using a machine learning model, where the machine learning mode uses the relationship between the objects as an input. The processing unit 147 and a memory 142 is configured to determine an action to process at least one object based on the privacy status inferred. The processing unit 147 and a memory 142 is configured to render a privacy-aware representation of the scene, wherein the privacy-aware representation displays the scene with at least one processed object.

The system 108 may comprise a receiving unit 141, e.g. a receiver or a transceiver with one or more antennas. The processing unit 147, the system 108 and/or the receiving unit 141 is configured to receive the scene for processing. The apparatus 108 may comprise a sending unit 143, e.g., a receiver or a transceiver with one or more antennas. The processing unit 147, the system 108 and/or the sending unit 143 is configured to transmit privacy aware representation to a recipient user or receiver.

The system 108 may comprise a control unit 140 with a content analyzer 204, a polarizer 206, and a renderer 208. The processing unit 147 and the content analyzer 204 is configured to identify one or more objects in the scene and define a relationship between the objects. The processing unit 147 and the polarizer 206 is configured to infer a privacy status to be tagged to the one or more identified objects by using a machine learning model. The processing unit 147 and the renderer 208 is configured to render a privacy-aware representation of the scene.

The embodiments herein may be implemented through a respective processor or one or more processors, such as a processor of the processing unit 147, together with a respective computer program 145 (or program code) for performing the functions and actions of the embodiments herein. The computer program 145 mentioned above may also be provided as a computer program product or a computer-readable medium 146, for instance in the form of a data carrier carrying the computer program 145 for performing the embodiments herein when being loaded into the system 108. One such carrier may be in the form of a universal serial bus (USB) stick, a disc or similar. It is however feasible with other data carriers such as any memory stick. The computer program 145 may furthermore be provided as a pure program code on a server and downloaded to the system 108. The features of the embodiments described herein may be implemented in hardware and/or software.

Figure 4A:
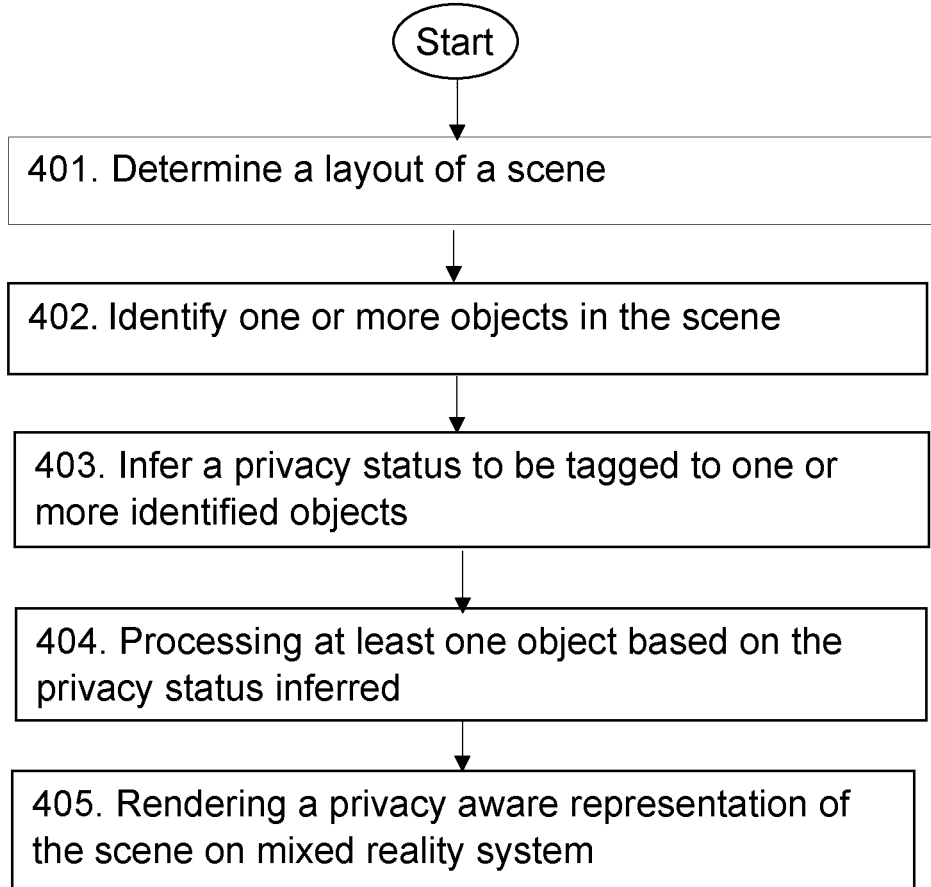
FIGS. 4*a*, 4*b* and 4*c* are schematic flowcharts depicting a method performed by the apparatus according to embodiments herein.
Figure 4B:
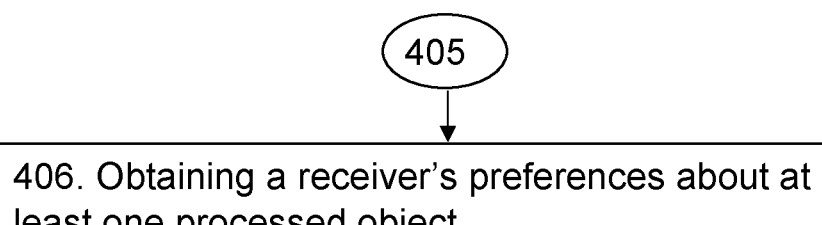
Figure 4C:
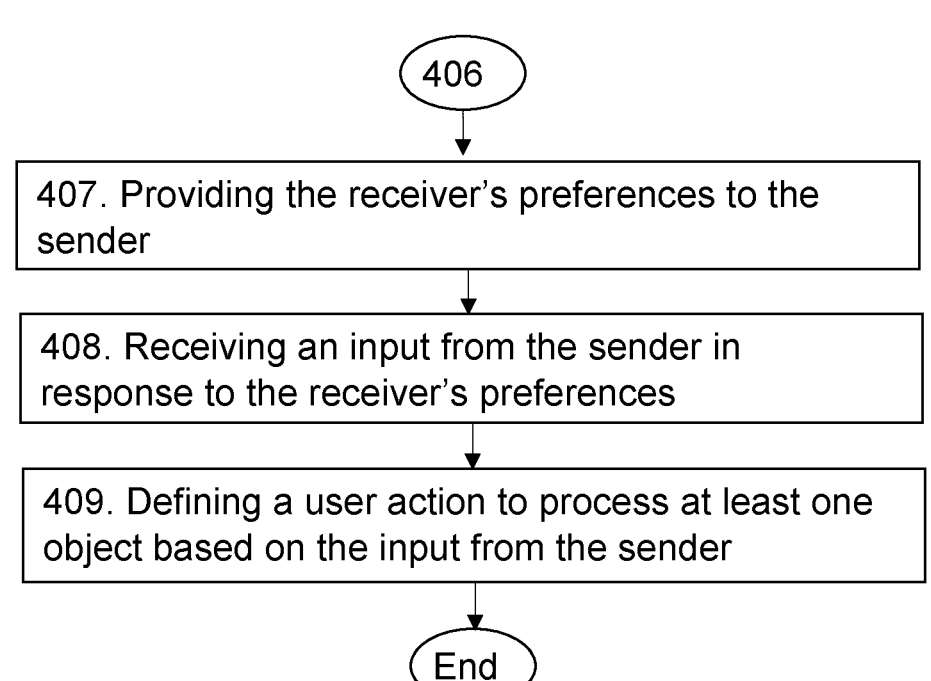

The method actions performed by the system 108 for providing a privacy-aware representation, according to embodiments will now be described using a flowchart depicted in FIGS. 4a, 4b and 4c. FIGS. 4a, 4b and 4c are flowcharts illustrating methods according to some embodiments.

According to some embodiments, method is a computer-implemented method of facilitating a privacy-aware representation in a system (108). The method comprises step 401 of determining a layout of a scene through a content analyzer. The scene is received through a user input device and the scene comprises a set of objects with varying privacy requirements. Examples of user input device include camera, sensors, tactile device, haptic device, head mount device, wearables, or any device capable of controlling a sensory actuator and the like. The method comprises step 402 of identifying one or more objects in the scene using the content analyzer to define a relationship between the objects.

The method comprises step 403 to infer a privacy status to be tagged to the one or more identified objects by using a machine learning model. Initially, the machine learning model is configured in a training phase with the one or more identified objects as input to define a state of the one or more identified objects. The state indicates an existing privacy status of each object at various timesteps. In an example, the state is defined by assigning a value of 0 or 1 against each object. The state value of 0 could indicate that the object is privatized, and the state value of 1 could indicate that the object is public.

The method further comprises step 404 to process at least one object based on the privacy status inferred. The process is determined based on an action predicted for the one or more identified objects. The action is determined by the machine learning model that predicts the action $(a'_i)$ to process the one or more identified objects. In an example, the action could be indicated by values of zero defining a complete concealing (or blur) of the object, and value of one defining revealing of the object. Based on the determined action, the object is processed to perform partial or complete masking (or blurring). In another embodiment, the determined action may be used to process the object by transforming. In case of masking and blurring, then an action can be a normalized value between 0 and 1 to indicate the degree of masking. For example, 0 would mean that there is no masking or blurring applied to the object, whereas 1 means that the object is completely masked or blurred. The action space can be continuous or discrete, meaning that values can be arbitrary within [0,1] or they can increase in a stepwise approach, e.g., 0, 0.1, 0.2, 0.3 . . . (step of 0.1). In case of object transformation, the action space consists of vertices and their position in space (using a 3D coordinate system and a fixed point of reference in the scene), as well as the texture of the object (in terms of e.g., solid color for all pixels in the simplest case, or complex bitmaps with different RGB values in the most complicated case). Both texture composition and/or number and location of vertices can change.

Thereafter, the method comprises step 405 to render a privacy-aware representation of the scene on the system. The privacy-aware representation displays the scene with at least one processed object.

The method further comprises step 406 to obtain a receiver's 214 preferences about at least one processed object from the privacy-aware representation through a point of interest 212. This is achieved by obtaining receiver's 214 preferences through a point of interest module 212. The point of interest module 212 may be configured to capture receiver's 214 eye gaze, tactile movements or touch and thereby identify objects of interest for the receiver.

Thereafter, the method further comprises step 407 to provide the receiver's 214 preferences to the sender 202. The sender 202 understands the objects of interest for the receiver 214 and then provides an input in response to the receiver's 214 preferences. In an example, the sender 202 may provide input to reveal objects of interest for the receiver. In another example, the sender 202 may provide input to conceal objects of interest for the receiver.

The method further comprises step 408 to receive an input from the sender 202 in response to the receiver's 214 preferences.

The method further comprises step 409 to define a user action $a_i$ to process at least one object based on the input from the sender. The user action may be updated in the state-action table discussed in Table 1 and Table 5. Based on the user action, the polarizer is configured to process at least one object by either displaying, concealing or transforming the objects of interest.

In order to improve accuracy of identifying objects as private over time, the delta (or difference) between predicted action $a'_i$ generated by the reinforcement learning agent and a user action $a_i$ defined by the sender 202 should be as small as possible. Thus, the method includes implementing a reward function to obtain the receiver's 214 preferences about at least one object in the privacy-aware representation. Thereafter, the machine learning model 207 is trained to calculate a reward (r) which enables the agent to predict the action that is similar to the user action by minimizing or maximising the difference between the predicted action and the user action using a weight factor per object. In an example, the reward may be a based on a maximizing function that increases the reward based on selection of accurate predicted action. In an example, the reward may be a minimizing function that decreases the reward based on selection of wrong predicted action.

The Reward is Calculated Using the Formula, $$\text{reward} = \sum_i^n w_i(a_i' - a_i)$$

wherein, $w_i$ is the weight factor per object, $a_i'$ is the predicted action, and $a_i$ is the user action. The weight factor per object may vary based on the privacy status (or importance) of the objects or object categories.

Based on the reward calculated and user action di, the state and action associated with the one or more identified objects (defined in state space and action space of Table 1 and Table 5) are updated iteratively to improve the accuracy of predicted actions ($a_i'$).

Figure 5:
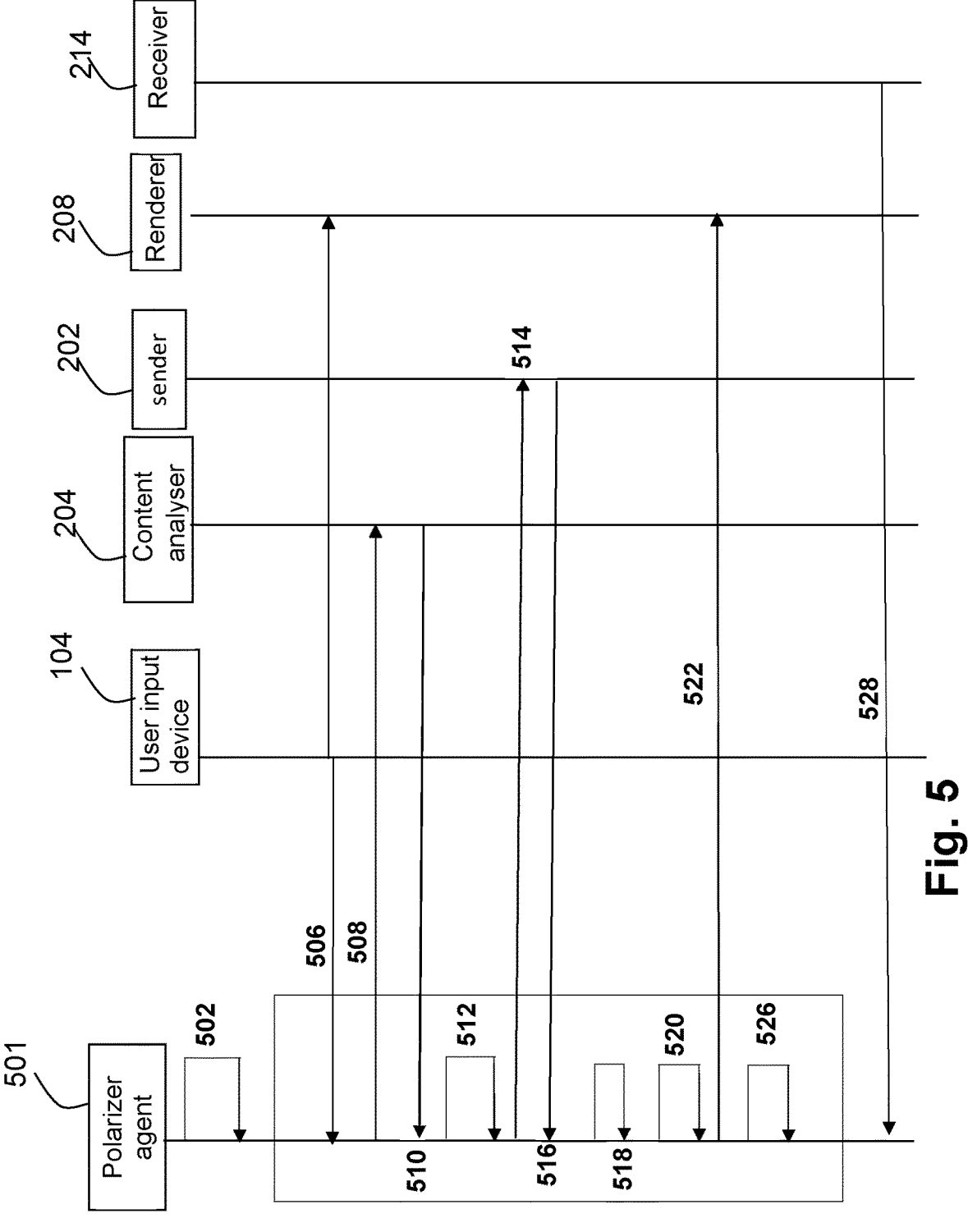
FIG. 5 is a schematic flowchart illustrating a process according to some embodiments.

FIG. 5 is a flowchart illustrating a process according to some embodiments. A polarizer agent 501 may be a reinforcement learning agent executed by the polarizer 206 discussed above, the user input device 104 may be a camera that can capture scenes from an environment present around the sender 202. The content analyzer 204, the sender 202, and the renderer 208 were discussed above in connection with FIG. 2b. FIG. 5 illustrates a process of reinforcement learning, according to some embodiments.

At 502, a polarizer agent 501 is initialized in a Q learning model with a Q-table. Steps 502 may be used to train a machine learning model as discussed above using observations of an old and new state, action and the reward for that action.

At 506, a scene is received by the polarizer agent 501 from a user input device 104, for example, camera.

At 508, the content is analyzed by the content analyzer 204. The content analyzer 204 uses a convolutional neural network as described previously in FIG. 1b to identify a set of objects present in the scene. The content analyzer 204 also determines a relationship between the set of objects.

At 510, the analyzed content with a set of identified objects and their relationship is transmitted to the polarizing agent 501.

At 512, an action (a') is predicted for the set of identified objects by using argmin (Q (state)) to select action that has lowest Q-value from the Q-table. The low Q-value would ensure that the difference between the predicted action and the user action is minimum. In another example, the action may be based on a Markov decision process. In an example, the action could indicate processes for the one or more identified objects. The action could be indicated by a low value 0, or a high value 1, or any value between 0 and 1. In an example, the values of predicted action, such as 0 or 1 and any number between 0 to 1 could indicate one of masking the object, or revealing the object or transforming the object.

At 514, the predicted action (a') is provided to the sender 202 to obtain input therefrom.

At 516, the predicted action is updated (update (a,i)) to the user action ($a_i$) based on the inputs received from the sender 202, where the user action, a or $a_i$ is the action preferred/defined by the sender 202 for the object in the scene for a time instance i. The user action could be defined by one of masking the object, or reveal the object or transform the object.

At 518, the polarizing agent calculates a reward r (i) based on a difference between predicted action ($a_i'$) and the user action ($a_i$) and provides the observations about new state s(i+1) to the polarizing agent. The reward enables the agent to predict the action similar to the user action by minimizing the difference between the predicted action and the user action using a weight factor per object.

At 520, the polarizing agent 501 processes the scene based on the user action ($a_i$) selected at step 514, to process at least one object. The processing may comprise performing partial or complete masking of the object, or transformation of the object.

At 522, the processed scene with at least one processed object is provided to renderer 204. The processed scene indicates a privacy-aware representation of the scene to a receiver.

Steps 506 to 522 may be performed for a predetermined number of iterations to train the machine learning algorithm, for example, the Q-learning model to define states and actions as shown in Table 1 to Table 5. In some embodiments, steps 510, 518, and 522 are performed using a convolutional neural network and/or mean-square algorithm in polarizer agent 501.

At step 526, a random minibatch of experiences <s(j+1), a(j+1), r(j)> are selected to perform Q-learning. The polarizer agent 501 executes Q-learning using the formula:

Q(s,a)=R(s,a)+γ*max{Q (s',a')}, where R is the reward function (described previously in step 518) and y is the discount factor which describes the tradeoff between immediate and long term reward of the predicted action (a') for future reference. In this step, the Q-table is updated with improved Q-values associated with state s and action a, so that the agent selects actions with maximum Q-value.

In another embodiment, step 526 could also be performed by an actor critic agent working together to determine Q value.

In an execution phase, the steps 506 to 512 are executed by the polarizer agent 501 to predict an action to be taken for privacy-aware representation of objects henceforth without sender interference. In an embodiment, the steps 506 to 512 could be executed by using one of supervised learning, unsupervised learning, reinforcement learning, Q-learning and the like. After executing the reinforcement learning process as explained above, the predicted action could be used for processing the one or more identified objects in the scene.

At step 528, the polarizer agent 501 may receive a feedback from the receiver 214 after viewing the privacy aware representation of the scene on the renderer 208. The feedback may include receiver's preferences of least one processed object present in the privacy aware representation. Further, in the feedback, the receiver could indicate if they are receiving any private object or scene. The feedback could be communicated to the sender 202, based on which the sender could update the user action ($a_i$).

According to some embodiments herein, the polarizer agent could be configured and to learn and process one of audio content, tactile information, smell and taste. In an example, the polarizer agent could be configured to process some parts of the audio content and identify a private content within the audio and render an output where private content is muted or deleted.

Certain embodiments may provide one or more of the following technical advantage of customizing privacy for each user in the mixed reality environment. Another advantage is that embodiments herein overcome the need for a labelled dataset with entire list of objects and their privacy status. This is achieved by the machine learning model that learns the choices made by the sender overtime to define privacy status of each object. This enhances prediction of privacy for each object with time. Yet another advantage is that the learnings and privacy status could be stored on equipment's on sender's side such as tablet, headset, smartphone, thereby improving privacy. Yet another advantage is that embodiments herein could be implemented on any hardware device with computing capabilities, and data (state-action data from machine learning model) could be implemented in a coarse-grained API, where data is typically housed in a few large components, or as a fine-grained API, where data is spread across a large number of smaller components.

When using the word "comprise" or "comprising" it shall be interpreted as non-limiting, i.e. meaning "consist at least of".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A computer-implemented method for facilitating a privacy-aware representation in a system, the method comprising:

determining, using a content analyzer, a layout of a scene, wherein the scene is received through a user input device and the scene comprises a set of objects with varying privacy requirements;

identifying, using the content analyzer, at least a first object in the scene and a second object in the scene;

determining a relationship between the first object and the second object;

inputting to a machine learning model relationship information indicating the determined relationship between the first object and second object;

after inputting the relationship information to the machine learning model, obtaining from the machine learning model privacy information indicating an inferred privacy status for the first object;

processing the first object based on the inferred privacy status to produce a first processed object; and rendering a privacy-aware representation of the scene, wherein the privacy-aware representation displays the scene with at least the first processed object.

2. The method of claim 1, wherein processing the first object comprises one of: partially concealing the first object, completely concealing the first object, transforming the first object, or transforming an area around the first object.

3. The method of claim 1, wherein the method further comprises:

obtaining a receiver's preferences about the first processed object from the privacy-aware representation through a point of interest module.

4. The method of claim 3, wherein the point of interest module comprises one or more sensors to capture the receiver's eyes gaze, tactile movements, or touch.

5. The method of claim 3, wherein the method further comprises:

providing the receiver's preferences to a sender;

receiving an input from the sender in response to the receiver's preferences; and defining a user action based on the input from the sender, by the machine learning model to process the first object.

6. The method of claim 1, wherein the method further comprises configuring the machine learning model in a training phase with the first object as input to define a state of the first object, wherein the state indicates an existing privacy status associated with the first object.

7. The method of claim 1, wherein the method further comprises configuring the machine learning model in a training phase to predict an action to process the first object.

8. The method of claim 1, wherein the method further comprises configuring the machine learning model in a training phase to iteratively update the state and action associated with the first object based on the user action.

9. The method of claim 1, wherein the method further comprises configuring the machine learning model to calculate a reward, r, which enables an agent to predict an action similar to a user action by minimizing or maximizing a difference between a predicted action and the user action using a weight factor per object.

10. The method of claim 1, wherein the machine learning model is trained using one a reinforcement learning algorithm, an unsupervised machine learning, and a Q-learning algorithm.

11. The method of claim 1, wherein the scene comprises at least one of an image content, audio-visual content and an audio content.

12. The method of claim 1, wherein the user input device is one of a camera, a speaker, a headphone, a network node, a tactile device or any device capable of controlling a sensory actuator.

13. The method of claim 1, wherein the system is at least one of a wearable device, a hand-held device, a distributed computing system, or computing device configured to render mixed reality, augmented reality, extended reality, or virtual reality.

14. A non-transitory computer readable storage medium storing a computer program comprising instructions which when executed by a processing unit of the system causes the system to perform the method of claim 1.

15. A system for facilitating a privacy-aware representation, the system comprising:

memory; and processing circuitry, wherein the system is configured to perform a method comprising:

determining, using a content analyzer, a layout of a scene, wherein the scene is received through a user input device and the scene comprises a set of objects with varying privacy requirements;

identifying, using the content analyzer, at least a first object in the scene and a second object in the scene;

determining a relationship between the first object and the second object;

inputting to a machine learning model relationship information indicating the determined relationship between the first object and second object;

after inputting the relationship information to the machine learning model, obtaining from the machine learning model privacy information indicating an inferred privacy status for the first object;

processing the first object based on the inferred privacy status to produce a first processed object; and rendering a privacy-aware representation of the scene, wherein the privacy-aware representation displays the scene with at least the first processed object.

* * * * *